United States Patent Office 3,214,419
Patented Oct. 26, 1965

3,214,419
LITHIUM NITRATE AS A POLYMERIZATION CATALYST FOR STYRENE, ACRYLAMIDE, AND OTHER UNSATURATED POLYMERS
Russell B. Hodgdon, Jr., Beverly, Mass., assignor to Monsanto Company, a corporation of Delaware
No Drawing. Filed Mar. 29, 1961, Ser. No. 99,035
9 Claims. (Cl. 260—89.7)

This invention relates to a process for the polymerization of unsaturated monomers. More particularly, this invention relates to a novel catalyst for effecting polymerization of monomers containing a $CH_2=C<$ linkage in the molecule, commonly called vinylidene compounds or ethylenically unsaturated compounds.

Many vinylidene monomers have been polymerized by the aid of a variety of catalytic substances utilizing a free-radical mechanism, while other substances operate by means of an ionic mechanism of catalysis. It is very often desirable to employ a cationic type catalyst in the polymerization of monomers in order to produce higher molecular weight polymers and certain vinyl monomers can be polymerized no other way. Unfortunately, cationic type catalysts, such as the Friedel-Crafts catalysts, initiate such violent polymerization reactions with some vinyl monomers that the polymerization must be effected either at very low temperatures or in the presence of a diluent or solvent in order to control the polymerization reaction.

I have discovered that lithium nitrate is a very suitable initiator or catalyst for the ionic polymerization of many vinylidene monomers in an improved manner.

An object of this invention is to provide for ionic polymerization of many vinylidene monomers in an improved manner.

Another object of this invention is to provide a novel catalyst for the polymerization and copolymerization of certain vinyl monomers in an improved manner.

Another object of this invention is to provide a process for polymerizing certain ethylenically unsaturated monomers in a controlled manner using an ionic type polymerization catalyst.

Another object of this invention is to provide a process for polymerizing certain vinyl monomers to obtain high molecular weight polymers and copolymers at ordinary temperatures.

Another object of this invention is to provide a process for polymerizing certain vinylidene monomers to obtain high molecular weight polymers and copolymers in the absence of a diluent or solvent.

Other aspects, objects and advantages of this invention will be apparent from a consideration of the accompanying disclosure and appended claims.

According to this invention, ethylenically unsaturated monomers having pi electron densities surrounding the double bond at least as great as the pi electron density surrounding the olefinic double bond of styrene are polymerized and/or copolymerized in an improved manner in the presence of a catalytic amount of an initiator or polymerization catalyst comprising anhydrous lithium nitrate. Although the polymerization process of this invention may involve an ionic type catalytic polymerization, the polymerization takes place at a moderate rate which is controllable without danger of a violent or uncontrolled polymerization reaction taking place. The polymerization process of this invention can be effected at ordinary temperatures, including room temperature, in the presence or absence of a solvent, to produce moderate and high molecular weight polymers and copolymers of the particular ethylenically unsaturated monomers noted above. Also, the novel polymerization process of this invention provides for the polymerization of certain vinyl monomers which are only slightly or difficultly polymerized using a free-radical type catalyst.

Also, according to this invention, lithium nitrate is provided as a novel initiator or polymerization catalyst for the polymerization and/or copolymerization of certain ethylenically unsaturated monomers noted above.

The lithium nitrate catalyst of this invention is very specific in effecting polymerization and/or copolymerization reactions and other similar metal nitrates or other similar lithium salts are ineffective in initiating these reactions. Thus, it has been found that lithium chloride, lithium bromide, lithium carbonate, potassium nitrate, magnesium nitrate, and ammonium nitrate are ineffective in initiating the polymerization of vinyl monomers such as for example, acrylamide, styrene, and vinyl n-butyl ether.

The mechanism by which my novel catalyst affects polymerization of a wide variety of vinylidene monomers cannot be classified with certainty. With certain monomers lithium nitrate exhibits characteristics of a free-radical catalyst and yet with other monomers it appears to have characteristics of an ionic catalyst. For example, isobutylene, vinyl alkyl ethers, and α-methylstyrene are generally considered to be monomers that can only be polymerized by an ionic polymerization (Textbook of Polymer Chemistry by F. W. Billmeyer, Jr., page 264, Interscience Publishers, Inc., New York, 1957). Surprisingly, these monomers are readily polymerized in contact with my lithium nitrate catalyst. It is believed that electrical polarity has a significant effect in a polymerization proceeding according to an ionic mechanism and that this effect is definitely more pronounced compared with the case where a carbon-carbon double bond is attacked by an essentially neutral free-radical.

The monomeric compounds subjected to polymerization and copolymerization by the process of this invention consist of vinylidene type compounds which have high pi electron densities around the vinylidene double bond. Such monomeric compounds include vinylidene compounds having a wide variety of functional groups such as, for example, ethers, diols, alcohols, hydrocarbons, esters, amides, and the like, as well as a vinyl group, e.g., —$CH=CH_2$. Although the class of monomeric compounds which can be polymerized by the novel catalyst of this invention is very large, only those vinylidene compounds having high pi electron densities or a high basicity toward ionic catalysts can be used. Preferably, the vinylidene compounds which can be polymerized in the process of this invention have pi electron densities around the vinylidene double bond at least as great as the pi electron density around the olefin double bond of styrene. A particular value for the pi electron density of the styrene olefinic double bond cannot be stated because, as is well known to one skilled in the art, the value of the pi electron density of a carbon-carbon double bond in a compound is a statistical distribution of those electrons making up the >C=C< group and will vary in accordance with the conditions under which it is measured. However, one skilled in the art wishing to determine whether a particular vinylidene compound can be polymeized using the lithium nitrate catalyst for this invention can first measure and calculate the pi electron density of the styrene olefinic double bond and then measure and calculate the pi electron density around the olefinic double bond of the candidate ethylenically unsaturated monomer under the same conditions and compare the values obtained.

Examples of vinylidene monomers which have high pi electron densities and which can be polymerized using the novel lithium nitrate catalyst of this invention are as follows: vinyl isobutyl ether, vinyl n-butyl ether, 1-methoxy butadiene, 2-vinyloxy ethanol, vinyl butoxy ethyl ether, vinyl alkyl ethers wherein the alkyl group contains from 1 to 18 carbon atoms, α-methyl styrene, styrene, 4-vinyl pyridine, 3-methyl styrene, methacrylamide, acrylamide, N-methylolacrylamide and N-vinyl type monomers.

Examples of vinyl compounds which have low pi electron densities and which cannot be polymerized using the lithium nitrate catalysts of this invention, include the following: vinyl acetate, vinyl n-butyrate, vinyl stearate, methyl methacrylate, ethyl methacrylate, n-butyl methacrylate, methyl acrylate, ethyl acrylate, Cellosolve acrylate, methyl vinyl ketone, vinyl bromide, trichloroethylenes, diethyl fumarate, diallyl maleate, maleic anhydride, and acrylonitrile.

Although I have described a suitable method of determining whether my lithium nitrate catalyst can be used to catalyze the polymerization of a given vinylidene monomer, i.e., comparison of pi electron densities, certain other aspects of this selection can be considered. It is believed that effective polymerization rates are achieved due to a coordination of lithium nitrate with the monomer's carbon-carbon double bond. The coordination between lithium nitrate and the double bond depends upon the electrical polarity of the double bond. The lithium nitrate coordinates with compounds of the formula

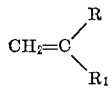

where R and R$_1$ have an electron-donating cumulative effect. When the cumulative effect of R plus R$_1$ can be expected to withdraw electrons from the double bond, the double bond has a decreased pi electron density, and the monomer is not polymerized by lithium nitrate catalyst. When R and R$_1$, taken together, have the effect of withdrawing electrons from the double bond, it can be observed that the groups constituting such effect are the groups, which if they were attached to a benzene ring, would be classified as meta-directing groups. Representative meta-directing substituents are

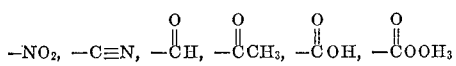

thus I have found that lithium nitrate has little or no effect in polymerizing monomers of the formula

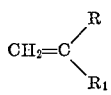

wherein at least one of the R or R$_1$ substituents is selected from the above list.

The monomers polymerizable by the use of lithium nitrate, as taught herein, have the characteristic formula

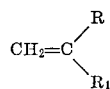

wherein the electrical effect of R and R$_1$, taken together, is to donate electrons to the double bond. The R and R$_1$ groups are found to be those groups, which if they were attached to benzene, would be considered ortho-para directing groups. According to certain preferred aspects of my invention, R and R$_1$ are radicals selected from the group consisting of H, —C$_6$H$_5$, —CH$_3$, —OR$_2$, wherein R$_2$ is an alkyl group of from 1 to 18 carbon atoms,

and —R$_3$ where R$_3$ is a hydrocarbon radical of from 2-4 carbon atoms. It will be understood that substituted styrenes wherein the phenyl ring contains one or more ortho-para directing groups can also be polymerized with lithium nitrate according to my invention. These substituents can be any of the ortho-para directing groups above as well as —N(CH$_3$)$_2$, —NH$_2$, —OH, —Cl, —Br, and —I.

Thus, I have set forth several criteria for selecting vinylidene compounds that can be polymerized by the practice of this invention. The reactivity of different monomers has been found to correspond to the electronic or polar effect of substituents upon the reactivity of double bonds toward electrophilic reagents. The differences of reactivity apparently arise from the change in pi electron density around the olefinic double bond of the monomer.

The concept of pi electron density around a monomeric, olefinic double bond, or the polar effect of a given monomer in comparison with a different monomer, has been expressed in a mathematical relationship by means of Q and e values, which correlate these values with the molecular structure of the monomer. When the Q and e values are considered, the Q value is correlated with the degree of resonance and the e value is correlated with the electron-donating or electron-accepting character of the substituent or substituents at the double bond. Although use of these Q and e values have found particular application in the prediction of monomer reactivities in copolymerization systems, a study of the concepts involved can lead to an understanding of the pi electron density classification advocated herein. The Monograph, Copolymerization, by Alfrey, Bohrer, and Mark (Interscience Publishers, Inc., New York, 1952), provides background information on the Q and e values.

Although some impurities may be present in the lithium nitrate catalyst of this invention without detrimental effect to initiating polymerization, and, in fact, may improve the polymerization, other impurities such as water may not be present in either the catalyst composition or the polymerization reaction mixture. Thus, the presence of water substantially inhibits the polymerization of vinylidene monomers using a lithium nitrate catalyst or initiator and, for this reason, it is necessary that the lithium nitrate catalyst be in substantially anhydrous form; that is, the lithium nitrate catalyst of this invention should contain less than about 1.0 weight percent water. Lithium nitrate for use in catalyzing the pollmerization of vinylidene monomers may be prepared by any of the methods known to those skilled in the art, or commercially available lithium nitrate may be used. Preferably, the lithium nitrate can be used in the form of a finely divided solid; however, it can also be used in other forms, such as pelleted form. A particular feature of my lithium nitrate catalyst is that it is operable as an initiator with certain monomers in either a heterogeneous or homogeneous system. For example, lithium nitrate is soluble to the extent of about 48 percent by weight in acrylamide at 85° C. and clear solutions of this monomer containing dissolved lithium nitrate readily produce high molecular weight polyacrylamide. Under certain circumstances it is desirable to isolate the polymer as a solid solution of lithium nitrate in polyacrylamide.

The lithium nitrate is activated for use in polymerization reactions by drying in the conventional manner to remove all water or to preferably reduce the water to an amount less than about 0.5 weight percent. In addition, other trace impurities present in the lithium nitrate may also be removed if desired; however, these other trace impurities usually do not have a substantial detrimental effect on the polymerization reaction. The catalyst is used in an amount as small as 1% by weight of the reaction mixture, including the solvent, if any, catalyst, and vinylidene monomer. The amount of catalyst can be as large as 200% by weight of the reaction mixture.

The polymerization process of this invention can be conducted at room temperature without danger of violent or uncontrollable polymerization reactions taking place. However, the rate of polymerization will vary with the different types of vinylidene monomers and low temperatures may be desirable in certain polymerizations in order to obtain polymers having particular characteristics. Ordinarily, the temperature of the polymerization reaction mixtures is maintained above −20° C. although lower temperatures can be used. It is often desirable in the polymerization of certain vinylidene monomers to elevate the temperature somewhat in order to increase the rate of polymerization; however, the temperature of the polymerization reaction mixture is not ordinarily increased above 150° C. even though higher temperatures can be used. Preferably, the polymerization reactions are conducted at a temperature within the range of from about 0° C. to about 100° C.

The polymerization process of this invention can be carried out at atmospheric pressure, which is ordinarily preferred. However, it is very often advantageous to use superatmospheric pressures sometimes as high as 1000 p.s.i. or higher in order to increase the rate of polymerization with certain monomers. The polymerization reactions of this invention can be accomplished in a period of time as small as 5 minutes up to a period of time as long as several days or even a week or more, depending upon the nature of the vinylidene monomer and the reaction conditions of temperature and pressure.

It is often desirable to carry out the polymerization reactions of this invention in an inert reaction medium or solvent; however, the use of such reaction medium or solvent is not necessary and suitable polymerizations can be carried out in bulk. The solvent, if one is used, should be one in which the vinylidene monomer is soluble and it is not necessary that the lithium nitrate catalyst be dissolved therein. Suitable solvents or inert diluents include the saturated aliphatic hydrocarbons such as, for example, the pentanes, hexanes, heptanes, and the like, usually containing from 5 to 12 carbon atoms; the aromatic hydrocarbons such as for example, toluene, xylenes, ethyl benzene, trimethylbenzene, and the like; and the dialkyl ethers, such as, for example, diethyl ether, diisopropyl ether, and the like. Alcohols, glycols, such as ethylene glycol and polyethylene glycols can also be used. Methyl ethyl ketone and higher homologous ketones can be used as solvents; however, acetone is not suitable for this purpose. Similarly, amines are not suitable as solvents for use in the polymerization process of this invention. The amount of solvent used may be in an amount as large as the amount of polymerizable monomer.

Polymerization reactions using the novel lithium nitrate catalyst of this invention may be performed by the polymerization of suitable vinylidene monomers, as defined above, of relatively high purity or in admixture with other polymerizable vinylidene monomers or non-polymerizable compounds including non-polymerizable vinylidene monomers. Thus, the polymerization process of this invention can be used to form homopolymers, as well as copolymers of the defined vinylidene monomers, and either inert substances or unpolymerizable substances can be present in the monomeric reactants. However, the monomeric stream to be polymerized must be substantially free of amines and water in order for the polymerization to be effective using the lithium nitrate catalyst of this invention, and, therefore, such monomeric streams containing these impurities must be subjected to a purification process prior to polymerization.

The advantages, desirability and usefulness of the present invention are illustrated by the following examples.

EXAMPLE 1

Acrylamide was selected as a suitable monomer to demonstrate the effectiveness of my novel lithium nitrate polymerization catalyst. Anhydrous lithium nitrate, dried at 103° C. in an oven to remove adsorbed trace quantities of water was maintained in an anhydrous condition by storage in a desiccator prior to use. By a series of solubility studies conducted with this anhydrous lithium nitrate, it was determined that about 48 g. dissolved in 100 g. acrylamide monomer at 85° C. to give a homogeneous solution. In the following examples all proportions are expressed as parts by weight.

A glass reactor was charged with 10 parts acrylamide and 5 parts anhydrous lithium nitrate and the reactants were then held at 82° C. by external heating. All but a trace quantity of the lithium nitrate dissolved. It was desired to maintain a solid catalyst phase in this run. After an induction period of 22 minutes, during which there was no evidence of reaction, polymerization occurred rapidly with liberation of heat which caused scorching of the solid polymer which was obtained in essentially quantitative yield.

EXAMPLE 2

In this run the polymerization reactor was charged with 30 parts acrylamide and 10 parts anhydrous lithium nitrate and the reactants heated to 82° C. There was no solid catalyst phase as a homogeneous solution resulted. Under these circumstances the induction period was lengthened to about 50 minutes, but once polymerization actually started it proceeded to the production of 100% polymer within a few seconds. This run demonstrates that the course of the polymerization reaction can be modified depending upon the presence or absence of a heterogeneous phase; however, there was no apparent difference in the physical properties of the polymer of Examples 1 and 2.

EXAMPLE 3

The polymerization reactor was charged with 30 parts acrylamide, 20 parts ethylene glycol and 50 parts anhydrous lithium nitrate. The diluent had a pronounced effect on the induction period, increasing it to about 1.5 hours at 82° C., and modifying the polymerization rate so that there was no tendency to obtain a flash-type reaction. The monomer was essentially completely converted to a rubbery, form stable polymer in about 0.5 hour after the induction period had terminated.

EXAMPLE 4

The initial reactor charge consisted of 10 parts acrylamide and 10 parts anhydrous lithium nitrate. The mixture was maintained at 70° C. by external heating. During a 4-hour period at 70° C. there was no perceptible exothermic effect although after this time there was a 50% conversion of monomer to polymer. After separation of the unreacted monomer a clear, solid, tough polymeric product was obtained. It was determined that this polymer contained dissolved lithium nitrate giving a solid solution. Samples of the solid solution were examined at intervals by X-ray diffraction technique and it was observed that definite characteristics of crystallinity appeared on aging, and the diffraction patterns indicated an increased amount of crystallinity. It is believed that this effect was caused by crystallization of the solute, lithium nitrate, within the polymer.

A separate sample of the polymer was dissolved in boiling benzene, filtered and then the polymer precipitated by the addition of methanol to the benzene solution. The polymer was then thoroughly washed with water to remove trace quantities of catalyst residues and then dried. Surprisingly, the solid solution of lithium nitrate in polyacrylamide had improved properties of stiffness and toughness with excellent clarity compared with the thoroughly washed polymer containing no catalyst residues.

EXAMPLE 5

A mixture of 10 part sacrylamide and 10 parts anhydrous lithium nitrate was maintained at 57° C. for 6 hours. At this temperature there was no evidence of an abrupt end to the induction period, as measured by a significant sudden temperature rise. After the 6-hour heating period it was determined that approximately 65% of the monomer had been polymerized to solid high molecular weight polymer of properties similar to the product obtained in Example 4.

EXAMPLE 6

A mixture of 30 parts acrylamide, 20 parts ethylene glycol and 50 parts anhydrous lithium nitrate was maintained at 57° C. in the polymerization reactor. At this temperature the polymerization proceeded at a very slow rate so that after a 48-hour reaction period approximately 60% of the monomer had been converted to solid polyacrylamide. At this temperature, and with the added effect of the inert diluent, there was no measurable heat of reaction and thus no determination could be made of the extent of the induction period. The isolated high molecular weight solid polymer was similar in its physical properties to the product obtained in Example 4 and Example 5.

EXAMPLE 7

In this example, various vinylidene monomers are subjected to polymerization using a freshly dried lithium nitrate catalyst. Prior to polymerization, the vinyl monomers were distilled. In carrying out the polymerization, 0.05 g. of the anhydrous lithium nitrate catalyst is placed into a 25 x 10 mm. test tube into which is added 0.5 to 3.0 g. of the selected vinylidene monomer and the desired solvent if one is used. The test tube is then stoppered immediately and subjected to the desired temperature by being left either at room temperature or by being immersed into a bath maintained at a desired elevated temperature. In each polymerization run, an additional test tube containing a similar amount of vinylidene monomer, but without catalyst addition, is subjected to the same polymerization conditions in order to insure that the observed polymerizations are not catalyzed by heat alone. Upon completion of the polymerization reactions, the polymers are removed from the respective test tubes, washed with water in a quantity 10 times the weight of polymer to remove lithium nitrate. The polymer is then dissolved in an appropriate solvent, e.g., benzene, in an amount approximately 50 times the weight of polymer, precipitated with an equal volume of appropriate nonsolvent, e.g., methanol, filtered and dried at 80° C. overnight. The polymers are obtained in yields greater than 60 percent. A summary of the monomers polymerized is included in Table I; Table II shows the unsuccessful runs.

Table I

| Vinylidene Compound | Amount [1] of Catalyst, Percent | Solvent | Temp., °C. | Relative Rate of Polymerization |
|---|---|---|---|---|
| Vinyl isobutyl ether | 50 | None | 60-85 | MF. |
|  | 0 | None | 60-85 | N. |
| Vinyl n-butyl ether | 50 | None | 60-85 | MF. |
|  | 0 | None | 60-85 | N. |
| 1-methoxy butadiene | 25 | None | 60-85 | MF. |
|  | 0 | None | 60-85 | N. |
| Vinyl butoxy ethyl ether | 25 | None | 60-85 | MF. |
|  | 0 | None | 60-85 | N. |
| α-Methyl styrene | 50 | None | 60-85 | S. |
|  | 0 | None | 60-85 | N. |
| Styrene | 50 | None | 60-85 | MF. |
|  | 0 | None | 60-85 | N. |
| 4-vinyl pyridine | 50 | None | 60-85 | S. |
|  | 0 | None | 60-85 | N. |
| 4-methyl styrene | 25 | None | 60-85 | MF. |
|  | 0 | None | 60-85 | N. |
| Methacrylamide | 25 | None | RT-60 | F. |
|  | 0 | None | RT-60 | N. |
| Do | 25 | [2] | RT-60 | F. |
|  | 0 | [2] | RT-60 | N. |
| Acrylamide | 25 | None | 60-85 | M. |
|  | 0 | None | 60-85 | N. |
| Do | 25 | [2] | 60-85 | M. |
|  | 0 | [2] | 60-85 | N. |
| N-methylol acrylamide | 25 | None | RT-60 | M. |
|  | 0 | None | RT-60 | N. |
| Do | 25 | [2] | RT-60 | M. |
|  | 0 | [2] | RT-60 | N. |
| Vinyl formate | 50 | None | 85 | S. |
|  | 0 | None | 85 | N. |
| Do | 50 | [3] | 85 | S. |
|  | 0 | [3] | 85 | N. |

[1] Percent by weight based on weight of total reaction mixture.
[2] Methyl ethyl ketone.
[3] Ethyl acetate.
N—None.
M—Moderate.
S—Slow.
MF—Moderately Fast.
F—Fast.
RT—Room Temperature.

Table II.—Unsuccessful polymerization runs [1]

VINYLIDENE COMPOUND

Methyl methacrylate
Ethyl methacrylate
n-Butyl methacrylate
Methyl acrylate
Ethyl acrylate
Cellosolve acrylate
Methylvinyl ketone
Allyl acetate
Allyl alcohol
Allyl amine
Allylidene diacetate
Diethyl fumarate
Diallyl maleate
Maleic anhydride
Acrylonitrile
Vinyl bromide
Trichloroethylene
Vinyl acetate
Vinyl n-butyrate
Vinyl stearate
2-vinyl pyridine

[1] Polymeriaztion conditions:
Catalyst concentration—50% by weight based on monomer charge.
No solvent or diluent used.
Temperature of polymerization—85° C.

EXAMPLE 8

Anhydrous lithium nitrate is effective in preparing copolymers from selected vinylidene monomers as described above. The comonomers and anhydrous lithium nitrate in an amount equal to the total amount of monomers are heated at a temperature of 85° C. The solid copolymers are formed in approximately 10 minutes in yields greater than 80%. Copolymers that can be made in this manner include vinyloxy ethanol copolymerized with acrylamide, acrylamide copolymerized with methacrylamide, acrylamide copolymerized with N-methylol acrylamide, vinyl n-butyl ether copolymerized with vinyl-isobutyl ether and acrylamide copolymerized with vinyl formate.

In general, the polymer products obtained in the polymerization process of this invention are solids and have properties similar to the properties of the same polymers obtained using other polymerization catalysts. For example, the polymers of the vinyl ethers have average molecular weights as high as 20,000 and the polymers of styrene have average molecular weights of 300,000 to 400,000. Certain monomers, for example, vinyl ether monomers, give quantities of lower molecular weight polymer. The polymer products obtained in the process of this invention can be used in the usual manner according to procedures well known to those skilled in the art, for example, in making injection molded and compression molded articles, and in other forms such as films, surface coatings, adhesives, monofilaments, and the like.

Reasonable variation and modification of the invention as described are possible, the essence of which is that there have been provided (1) methods for polymerizing certain vinyl and vinylidene monomers to obtain polymeric materials in an improved manner and (2) a polymerization catalyst composition comprising lithium nitrate

I claim:

1. A process for the polymerization of an unsaturated monomer, said monomer being characterized by having a pi electron density around its olefinic double bond at least as high as the pi electron density around the olefinic double bond of styrene, and further characterized by the formula

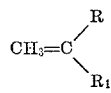

wherein R is selected from the group consisting of —H, —CH$_3$ and OR$_2$ radicals in which R$_2$ is an alkyl group of from 1 to 18 carbon atoms, and R$_1$ is selected from the group consisting of —C$_6$H$_5$,

hydrocarbon radicals of from 2 to 4 carbon atoms and —OR$_2$ radicals in which R$_2$ is an alkyl group of from 1 to 18 carbon atoms, which comprises contacting said monomer with lithium nitrate at a temperature in the range of from —20° C. to 150° C. and recovering a polymeric product.

2. The process of claim 1 wherein the unsaturated monomer is contacted with from about 1% to about 200% of the weight of the monomer of lithium nitrate.

3. The process of claim 1 wherein the polymeric product is recovered as a solid solution of lithium nitrate in polymeric product.

4. A process for the polymerization of an unsaturated monomer, said monomer being characterized by having a pi electron density around its olefinic bond at least as high as the pi electron density around the olefinic double bond of styrene, said monomer having the general formula

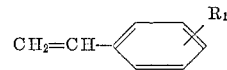

wherein R$_1$ is selected from the group consisting of —CH$_3$,

—N(CH$_3$)$_2$, —NH$_2$, —OH, —Cl, —Br, —I and —OR$_2$ in which R$_2$ is an alkyl group from 1 to 18 carbon atoms, which comprises contacting said monomer with from about 1% to about 200% by weight of lithium nitrate at a temperature in the range of from —20° C. to 150° C. and recovering a polymeric product.

5. Process for the polymerization of styrene which comprises contacting said monomer with lithium nitrate at a temperature in the range from —20° C. to 150° C. and recovering a polymeric product.

6. Process for the polymerization of alpha methyl styrene which comprises contacting said monomer with lithium nitrate at a temperature in the range from —20° C. to 150° C. and recovering a polymeric product.

7. Process for the polymerization of acrylamide which comprises contacting said monomer with lithium nitrate at a temperature in the range from —20° C. to 150° C. and recovering a polymeric product.

8. Process for the polymerization of a vinyl alkyl ether of the formula

CH$_2$=CHOR$_2$ wherein R$_2$ is an alkyl radical from 1 to 18 carbon atoms, which comprises contacting said ether with lithium nitrate at a temperature in the range from —20° C. to 150° C. and recovering a polymeric product.

9. Process for the polymerization of methacrylamide which comprises contacting said monomer with lithium nitrate at a temperature in the range from —20° C. to 150° C. and recovering a polymeric product.

References Cited by the Examiner

UNITED STATES PATENTS

| | | | |
|---|---|---|---|
| 2,298,270 | 10/42 | Auer | 260—93.5 |
| 2,403,962 | 7/46 | Auer | 260—93.5 |
| 2,820,777 | 1/58 | Suen | 260—89.7 |

OTHER REFERENCES

Krezil: "Kurzes Handuch der Polymerizationstechnik," vol. 1, page 724, 1940 ed., published in Leipzig.

LEON J. BERCOVITZ, *Primary Examiner.*

HAROLD N. BURSTEIN, *Examiner.*